United States Patent Office 2,969,449
Patented Jan. 24, 1961

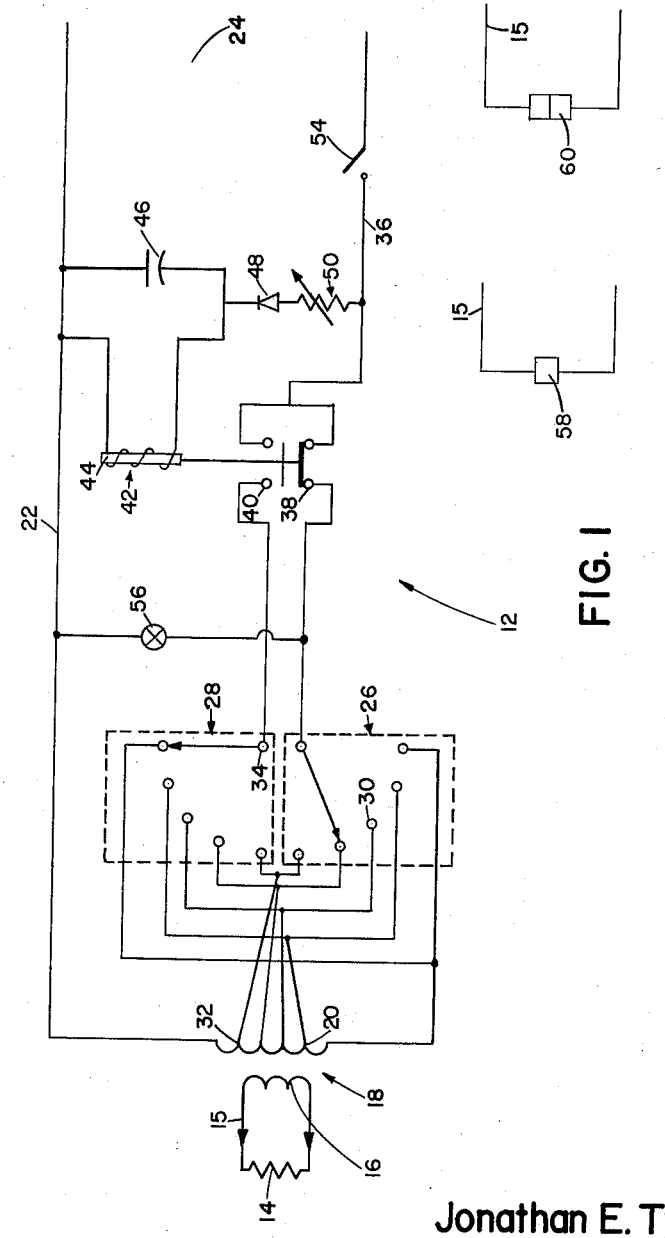

2,969,449
RESISTANCE SOLDERING POWER SUPPLY

Jonathan E. Tyler, Rochester, Mich., assignor to the United States of America as represented by the Secretary of the Army Filed Aug. 25, 1959, Ser. No. 836,045
3 Claims. (Cl. 219—20)

My invention relates to a soldering machine including a soldering iron and more particularly to such a machine for operating the iron at a pair of current values.

The process of preparing a solder joint between a pair of objects includes heating the objects to the melting temperature of the solder by conduction from a resistor, melting the quantity of solder required in the joint, and maintaining the solder in molten state during flow thereof in the joint.

Conventional low-heat (low-current) soldering machines operate at the current required to maintain the soldering iron at substantially the melting temperature of the solder. The additional heat required to raise the temperature of the object cools the iron and slows the process to allow oxide coatings to form on the contact surfaces of the solder. Such coatings impair the strength and conductivity of the joint.

When conventional high heat (high current) soldering machines are applied to such a joint, the temperature is high enough and the operation is rapid enough to prevent formation of the objectionable oxides, but insulation covering the objects is distorted or burned, and excess solder is usually melted to flow between terminals or contacts.

In particular soldering operations, the resistor may be replaced by the specimen to be soldered for resistance heating thereof to eliminate the heat loss of conduction.

An efficient soldering machine would combine the advantages of the low and high-heat machines and it is an object of my invention to provide a soldering machine disposed for operation in a pair of heat phases.

Another object of my invention is to provide such a machine disposed for successive operation in high and low-heat phases.

A further object of my invention is to provide such a machine having a transformer with a secondary and a resistor connected in series therewith for conductive heating of a specimen for soldering.

An additional object of my invention is to provide such a machine having terminals for selective connection therebetween of a resistor, and a specimen for soldering, or a pair of specimens for connection thereof by soldering.

Other aims and objects of my invention will appear from the following description.

In carrying out my invention, a soldering machine with a source of electric power includes a transformer including a secondary coil with a pair of terminals for connection across a heating unit such as the resistor of a soldering iron or across a specimen to be soldered, or connection across a pair of specimens disposed in series connection for formation of a soldered joint therebetween.

A pair of selector switches are shunt connected to the transformer taps and respectively connected to the power source through normally open and closed contacts of a solenoid.

The coil of the solenoid is connected in a resistance-capacitance (RC) timing circuit in shunt connection with a capacitor, and the RC circuit also includes a fixed resistance, a variable resistance, and a rectifier connected in series with the shunt connection across the terminals of the supply.

The settings of the selector switches determine the value of current flowing in the soldering iron, and the setting of the variable resistor determines the duration of the initial current in the resistor.

The machine includes a light connected across the supply to indicate energization thereof, and an indicator in shunt relation with the initial selector switch circuit to indicate energization thereof.

For more complete understanding, reference is directed to the following description and accompanying drawing, in which:

Figure 1 is a schematic view of one embodiment of my invention with a resistor connected between the terminals;

Figure 2 shows a specimen for soldering connected between the terminals; and

Figure 3 shows a pair of specimens for soldered connection disposed in series between the terminals.

Accordingly, a soldering machine 12 includes a soldering iron with a heating unit represented as a resistor 14 and a switching device including a transformer 18. Resistor 14 is connected in series with terminal 15 of the secondary coil 16 of transformer 18 and the transformer includes a primary coil 20 connected to a conductor 22 of an electrical supply 24.

The device includes initial and subsequent selector switches 26 and 28 with respective multiple fixed contacts 30 correspondingly shunt connected to taps 32 of primary 20. Movable contacts 34 of the respective switches are disposed for selective engagement with the multiple contacts to vary the currents for selective application to resistors 14 having particular values of resistance, and contacts 34 are respectively connected to the other conductor 36 of supply 24 through normally closed and open contacts 38 and 40 of a relay 42 of the device. Relay 42 includes a coil 44, and a capacitor 46 of the device is disposed in parallel connection with coil 44. The parallel connection is disposed in series connection with rectifier 48, and a rheostat 50 of the device to form a RC (resistance-capacitance) circuit, across supply 24.

Switch 54 is connected in conductor 36 to control operation of soldering machine 12, and an indicating light 56 is connected in shunt relation with the initial switch circuit to indicate energization thereof. When capacitor 46 is charged, solenoid 44 picks up, deenergizing switch 26 and indicator 56, and energizing switch 28 through contacts 40. No time limit is imposed on operation of low current switch 28. Light 56 indicates duration of the initial heat.

Figure 2 includes a heating unit as a specimen 58 connected between terminals 15. Specimen 58 is provided with resistances corresponding to those of resistors 14.

Figure 3 shows a heating unit as a pair of specimens 60 to be joined by soldering connected in series between terminals 15. The total resistances across specimens 60 correspond to the resistances of resistors 14.

While the foregoing is a description of the preferred embodiment, the following claims are intended to include those modifications and variations that are within the spirit and scope of my invention.

I claim:

1. In a machine disposed for soldering a specimen and provided with conductors of an alternating power source; and a pair of terminals for connection therebetween of the specimen; a switching device comprising a transformer with a secondary coil connected between the terminals, and a primary coil connected to one of the conductors and provided with taps; a pair of switches respectively provided with fixed contacts connected to said taps, and a movable contact disposed for selective engagement with the corresponding fixed contacts; and an RC circuit for switching to provide alternate connections of said movable contacts with the other of the conductors for resistive heating of the specimen in initial and subsequent phases at voltages corresponding to the selective engagement of the movable contact.

2. A switching device as in claim 1 with said RC circuit comprising a solenoid having a coil; a capacitor in shunt connection therewith; and a rectifier and a rheostat in series with said shunt connection between the conductors of the electrical supply; said solenoid having normally open and closed contacts respectively connected between said movable contacts and the other of the conductors for the switching.

3. A switching device as in claim 2 with said rheostat adjustable to vary the duration of the initial phase.

References Cited in the file of this patent
UNITED STATES PATENTS

| | | |
|---|---|---|
| 1,320,071 | Lehr | Oct. 28, 1919 |
| 2,436,887 | Hensley | Mar. 2, 1948 |
| 2,677,039 | Clark | Apr. 27, 1954 |
| 2,898,514 | O'Donnell et al. | Aug. 4, 1959 |